United States Patent
Kawamata

(10) Patent No.: US 8,706,269 B2
(45) Date of Patent: Apr. 22, 2014

(54) CONTROLLER AND MACHINING APPARATUS WITH POSITION ENCODER COMPENSATION

(75) Inventor: Naoki Kawamata, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 997 days.

(21) Appl. No.: 12/689,551

(22) Filed: Jan. 19, 2010

(65) Prior Publication Data

US 2010/0185340 A1  Jul. 22, 2010

(30) Foreign Application Priority Data

Jan. 19, 2009  (JP) .................................. 2009-009360

(51) Int. Cl.
*G05B 11/32* (2006.01)
*G05B 19/18* (2006.01)
*G05D 3/20* (2006.01)

(52) U.S. Cl.
USPC ............................................ 700/69; 318/632

(58) Field of Classification Search
USPC .............. 700/56, 69, 186; 318/600–605, 625, 318/632; 702/94–97, 155, 158, 163
See application file for complete search history.

(56) References Cited

U.S. PATENT DOCUMENTS

| | | | | |
|---|---|---|---|---|
| 5,021,650 A * | 6/1991 | Rieder et al. | ............ | 250/231.16 |
| 5,036,264 A * | 7/1991 | Ueki | ........................ | 318/400.13 |
| 5,625,310 A | 4/1997 | Takeishi | | |
| 5,943,639 A * | 8/1999 | Tanaka et al. | ................. | 702/163 |
| 6,188,341 B1 * | 2/2001 | Taniguchi et al. | ............ | 341/116 |
| 6,327,066 B2 * | 12/2001 | Takishima et al. | ......... | 359/198.1 |
| 6,600,150 B1 * | 7/2003 | Adkins et al. | ............ | 250/231.13 |
| 6,791,219 B1 * | 9/2004 | Eric et al. | ..................... | 310/68 B |
| 6,956,505 B2 * | 10/2005 | Taniguchi et al. | .............. | 341/11 |
| 7,066,591 B2 * | 6/2006 | Eaton et al. | .................... | 347/101 |
| 7,456,599 B2 * | 11/2008 | Piefer et al. | ................... | 318/625 |
| 7,457,713 B2 * | 11/2008 | Finkler et al. | ................... | 702/94 |
| 7,459,872 B2 * | 12/2008 | Woodland et al. | ............ | 318/605 |
| 7,966,158 B2 * | 6/2011 | Seo | ................ | 702/197 |
| 8,384,570 B2 * | 2/2013 | Hunter | ......................... | 341/112 |
| 2005/0015099 A1 * | 1/2005 | Momoi et al. | ................ | 606/130 |
| 2007/0008192 A1 * | 1/2007 | Fujita | .............................. | 341/50 |
| 2008/0013143 A1 * | 1/2008 | Ide et al. | ....................... | 359/223 |
| 2010/0045219 A1 * | 2/2010 | Ajima et al. | ............ | 318/400.04 |

FOREIGN PATENT DOCUMENTS

| | | |
|---|---|---|
| JP | 7-229757 A | 8/1995 |
| JP | 11-295105 A | 10/1999 |
| JP | 3524225 B2 | 5/2004 |

* cited by examiner

*Primary Examiner* — M. N. Von Buhr
(74) *Attorney, Agent, or Firm* — Rossi, Kimms & McDowell LLP

(57) ABSTRACT

A controller which generates a driving instruction to control driving of an object while detecting a position of the object based on two periodic signals that are provided by an encoder and have different phases, comprises a counter configured to count periods of one of the two periodic signals, and a processor configured to detect the position of the object based on an arctangent value of a ratio of values of the two periodic signals and a count value provided by the counter, and to generate the driving instruction based on the position, wherein the processor is configured to compensates an error in the count value based on the driving instruction generated in the past and an acceleration of the object computed based on the arctangent value and the count value, and to compute the position of the object based on the compensated count value.

8 Claims, 4 Drawing Sheets

F I G. 3
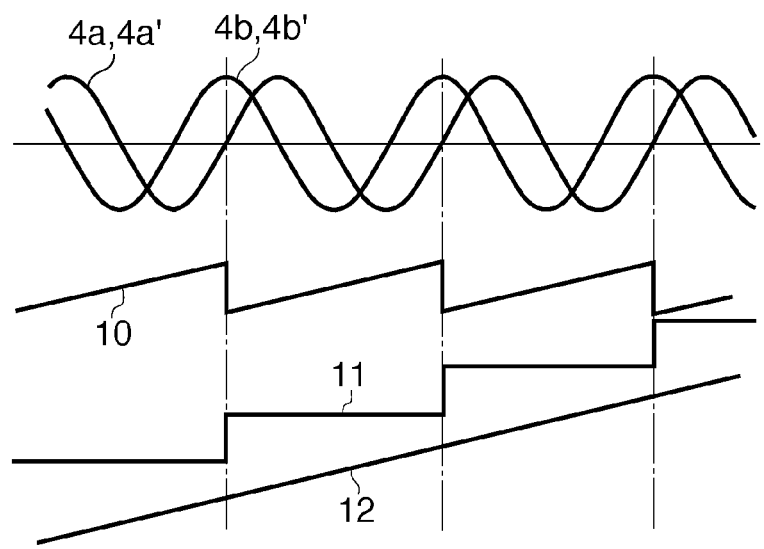
F I G. 4
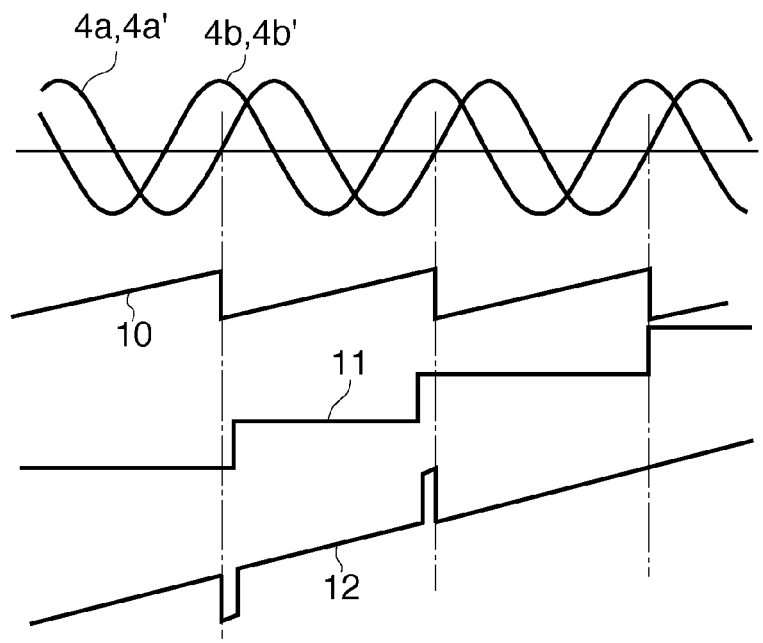

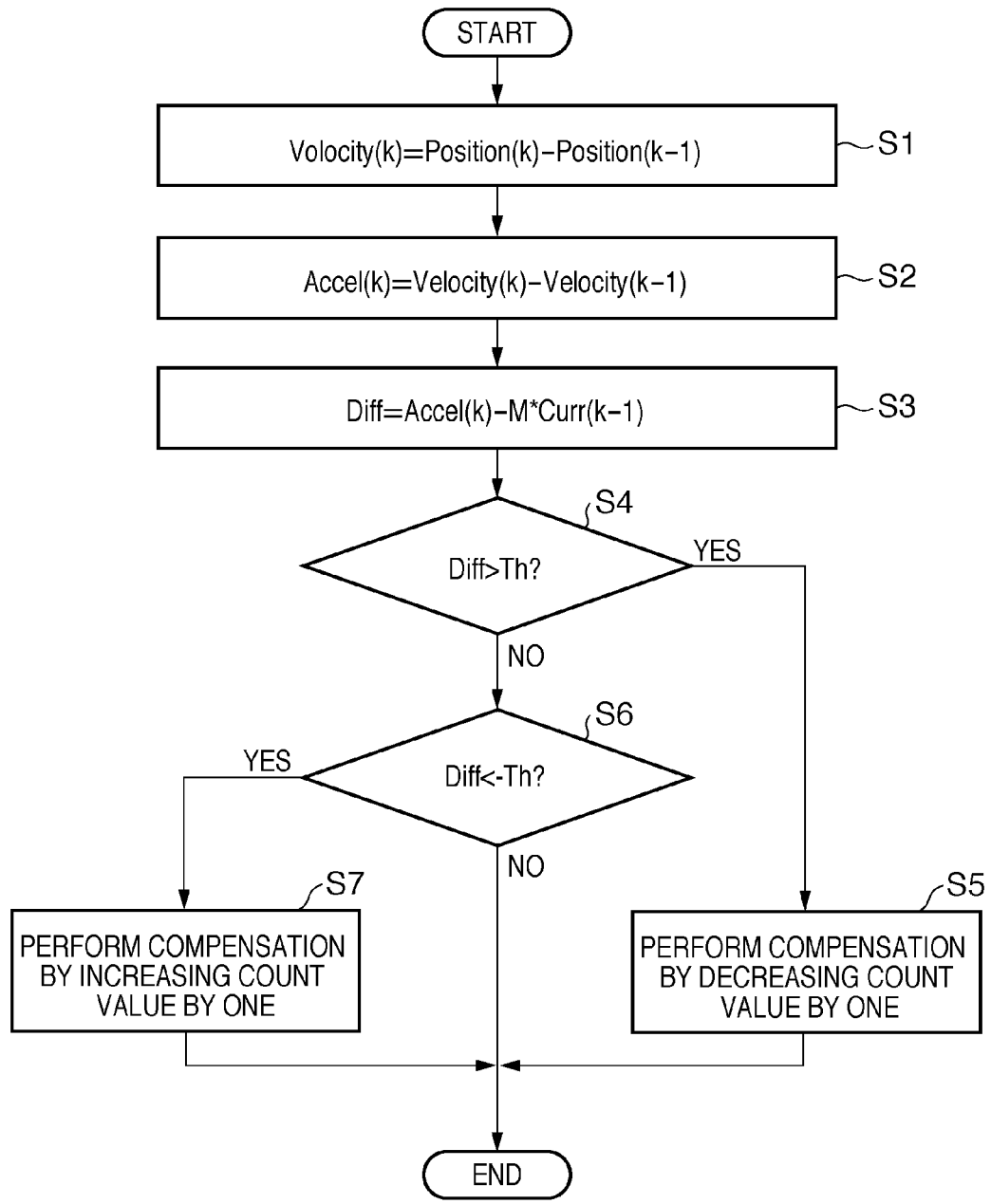

CONTROLLER AND MACHINING APPARATUS WITH POSITION ENCODER COMPENSATION

BACKGROUND OF THE INVENTION

1. Field of the Invention

The present invention relates to a controller and a machining apparatus having the same.

2. Description of the Related Art

There has been known a technique of detecting the position of an object based on two periodic signals having a phase difference of 90° which are generated by an encoder for encoding an object position. A count value obtained by counting the periods of one of the two periodic signals indicates an object position in periods. On the other hand, the arctangent value of the ratio of the two periodic signal values indicates an object position during one period. A signal representing the final object position can be obtained by combining the count value and the arctangent value. Unless the period count operation and the arctangent value processing operation completely synchronize, periodic errors occur in the value obtained upon combining the count value and the arctangent value. Conventionally, processing of compensating the periodic errors is done based on only the current values of the two periodic signals.

However, as the movement of the object speeds up with respect to the sampling period, it becomes more difficult to compensate the above-described periodic errors caused by the lack of synchronism between the period count operation and the arctangent value processing operation.

SUMMARY OF THE INVENTION

The present invention provides a technique advantageous for detecting and/or controlling, for example, the position of an object which moves at a high velocity.

One of the aspects of the invention provides a controller which generates a driving instruction to control driving of an object while detecting a position of the object based on two periodic signals that are provided by an encoder and have different phases, comprising a counter configured to count periods of one of the two periodic signals, and a processor configured to detect the position of the object based on an arctangent value of a ratio of values of the two periodic signals and a count value provided by the counter, and to generate the driving instruction based on the position, wherein the processor is configured to compensates an error in the count value based on the driving instruction generated in the past and an acceleration of the object computed based on the arctangent value and the count value, and to compute the position of the object based on the compensated count value.

Further features of the present invention will become apparent from the following description of exemplary embodiments with reference to the attached drawings.

BRIEF DESCRIPTION OF THE DRAWINGS

FIG. 3 is a timing chart showing representative signals in a signal processor;

FIG. 4 is a timing chart showing the discontinuity of position information;

FIG. 7 is a flowchart illustrating the count value compensation operation of a processor.

DESCRIPTION OF THE EMBODIMENTS

An embodiment of the present invention will now be described with reference to the accompanying drawings.

In this application, a term "position" includes "angle", a term "velocity" includes "angular velocity" and a term "acceleration" includes "angular acceleration".

Figure 1:
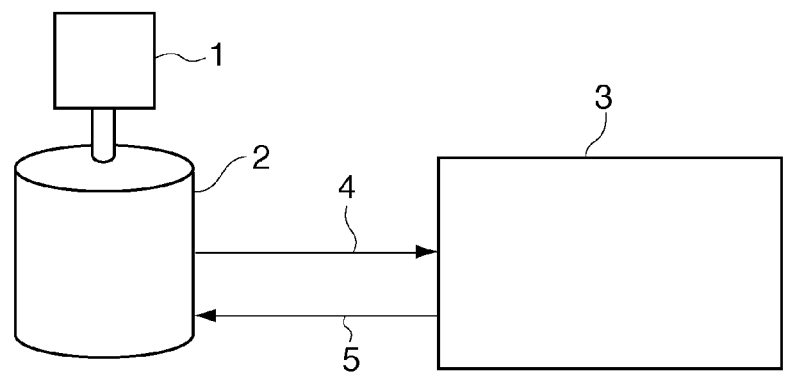
FIG. 1 is a view showing the schematic arrangement of a Galvano apparatus according to an embodiment of the present invention.

FIG. 1 is a view showing the schematic arrangement of a Galvano apparatus according to an embodiment of a machining apparatus of the present invention. The Galvano apparatus of the embodiment includes a mirror 1 as an object to be driven, a driving mechanism 2 which rotationally drives the mirror 1, and a controller 3 which controls the driving mechanism 2. The driving mechanism 2 incorporates an encoder for encoding the position (angle) of the mirror 1. The mirror 1 reflects a light beam from a light source (not shown) toward a machining target object. It is possible to change (typically, scan) the light beam incident position on the machining target object by controlling the position (angle) of the mirror 1 using the driving mechanism 2.

The encoder incorporated in the driving mechanism 2 generates two periodic signals 4 having different phases. While detecting the position (angle) of the mirror 1 based on the two periodic signals, the controller 3 generates a driving signal 5 to control driving of the mirror 1 to cause it to form a target angle, and supplies the driving signal 5 to the driving mechanism 2.

Figure 2:
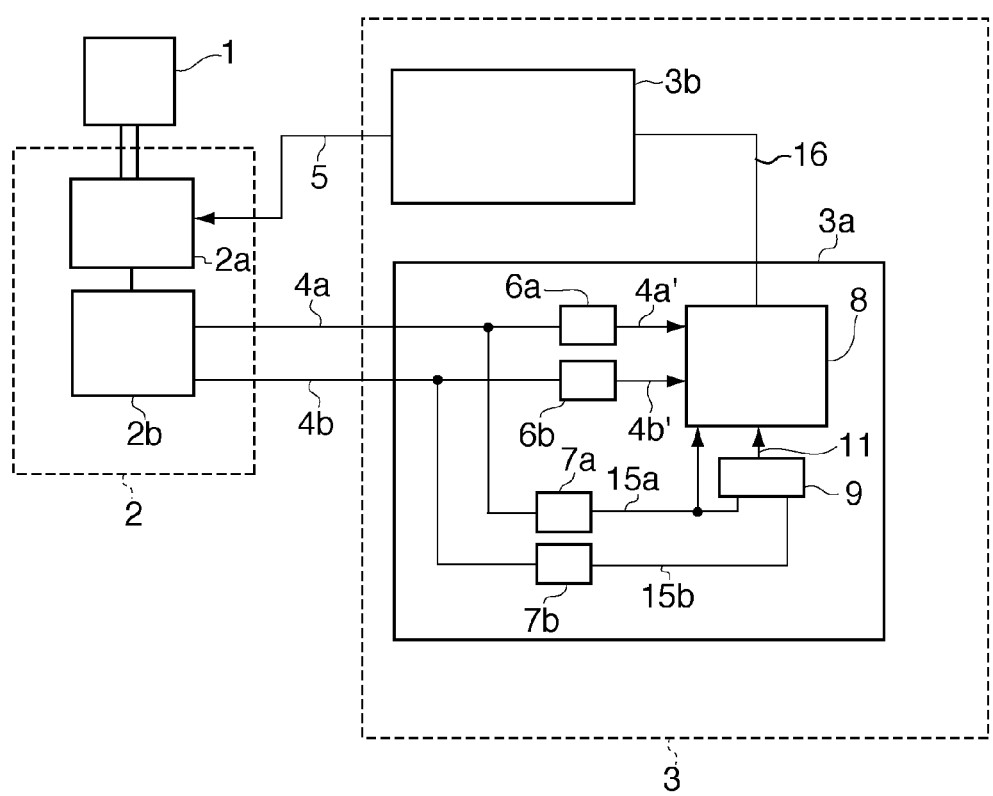
FIG. 2 is a block diagram showing a more detailed arrangement of the Galvano apparatus shown in FIG. 1.

FIG. 2 is a block diagram showing a more detailed arrangement of the Galvano apparatus shown in FIG. 1. The driving mechanism 2 can include a motor 2a and an encoder 2b. The controller 3 can include a signal processor 3a and a driving circuit 3b. The encoder 2b generates two periodic signals 4a and 4b. The two periodic signals 4a and 4b typically have a phase difference of 90°. For example, the periodic signal 4a can be a sine wave signal, and the periodic signal 4b can be a cosine wave signal.

Analog/digital converters (A/D converters) 6a and 6b digitize the periodic signals 4a and 4b and supply periodic signals 4a' and 4b' to a processor 8, respectively. Binarizing circuits 7a and 7b binarize the two periodic signals 4a and 4b and supply binary signals 15a and 15b, respectively, to a counter 9.

The counter 9 counts the periods of one of the binary signals 15a and 15b. The count operation includes count-up and count-down. Whether to count up or down is decided by the combination of the logic levels of the binary signals 15a and 15b. A count value 11 counted by the counter 9 is supplied to the processor 8. The processor 8 processes the arctangent value of the ratio of the periodic signals 4a and 4b, and based on the arctangent value and the count value 11, generates a driving instruction (current target value) 16 to control driving of the motor 2a and sends it to the driving circuit 3b. The driving circuit 3b generates the driving signal 5 in accordance with the driving instruction 16.

FIG. 3 is a timing chart showing representative signals in the signal processor 3a. Assume that the phase difference between the two periodic signals 4a and 4b (4a' and 4b') is 90°, the offset is 0, and the two periodic signals 4a and 4b (4a' and 4b') have the same amplitude. Note that an arrangement for compensating the two periodic signals 4a and 4b (4a' and 4b') when they do not satisfy the conditions is well-known, and the processor 8 can incorporate the arrangement.

The arrangement will be described below. To compensate the offset and amplitude, the maximum and minimum values of the periodic signals are obtained. The centers and amplitudes of the periodic signals are then computed from the maximum and minimum values. Compensation can be done based on the centers and amplitudes.

A method of compensating the phase difference between two periodic signals to 90° will be explained next. Periodic signals A and B' having a phase difference δ with respect to 90° are given by $$A=\cos\theta$$

$$B'=\sin(\theta+\delta)$$

When δ is obtained, the following B phase which exactly has the phase difference of 90° with respect to the A phase can be calculated by $$B=\sin\theta$$

The formula of trigonometric function yields $$\begin{aligned}B' &= \sin(\theta+\delta)\\&= \sin\theta\cdot\cos\delta + \cos\theta\cdot\sin\delta\\&= B\cdot\cos\delta + A\cdot\sin\delta\end{aligned}$$

where A and B' are the periodic signals output from the encoder. The periodic signal to be obtained is B, and the periodic signal B can be computed by $$B=(B'-A\cdot\sin\delta)\div\cos\delta$$

The method of obtaining 6 is described in, for example, Japanese Patent No. 3524225.

When the periodic signals 4a' and 4b' have the phase difference of 90°, an arctangent value 10 of the ratio of the values of the periodic signals 4a' and 4b' is a value that interpolates one period and is represented by a triangular wave shown in FIG. 3. When one period of the periodic signal 4a' or 4b' is divided by 1024, positions in one period can be expressed by 0 to 1023. In this case, one step of the stepped count value 11 output from the counter 9 corresponds to 1024. If the timing of step appearance in the arctangent value 10 coincides with that in the count value 11, the processor 8 can obtain position information 12 representing the position of the mirror 1 by combining, that is, simply adding the two values.

However, if the timing of step appearance in the arctangent value 10 does not coincide with that in the count value 11, discontinuity occurs in the position information 12, as shown in FIG. 4. The magnitude of discontinuity corresponds to one count value 11.

A conventional discontinuity compensation method will be described here with reference to FIG. 5. In accordance with the combination of the positive and negative values of the two periodic signals 4a and 4b, one period can be divided into four regions Z1, Z2, Z3, and Z4 as follows.

Region Z1: 4a≥0, 4b≥0
Region Z2: 4a≥0, 4b<0
Region Z3: 4a<0, 4b<0
Region Z4: 4a<0, 4b≥0

The binary signal 15a should go high in the regions Z1 and Z2 and low in the regions Z3 and Z4. The count value 11 should change at the boundary between the regions Z4 and Z1.

Figure 5:
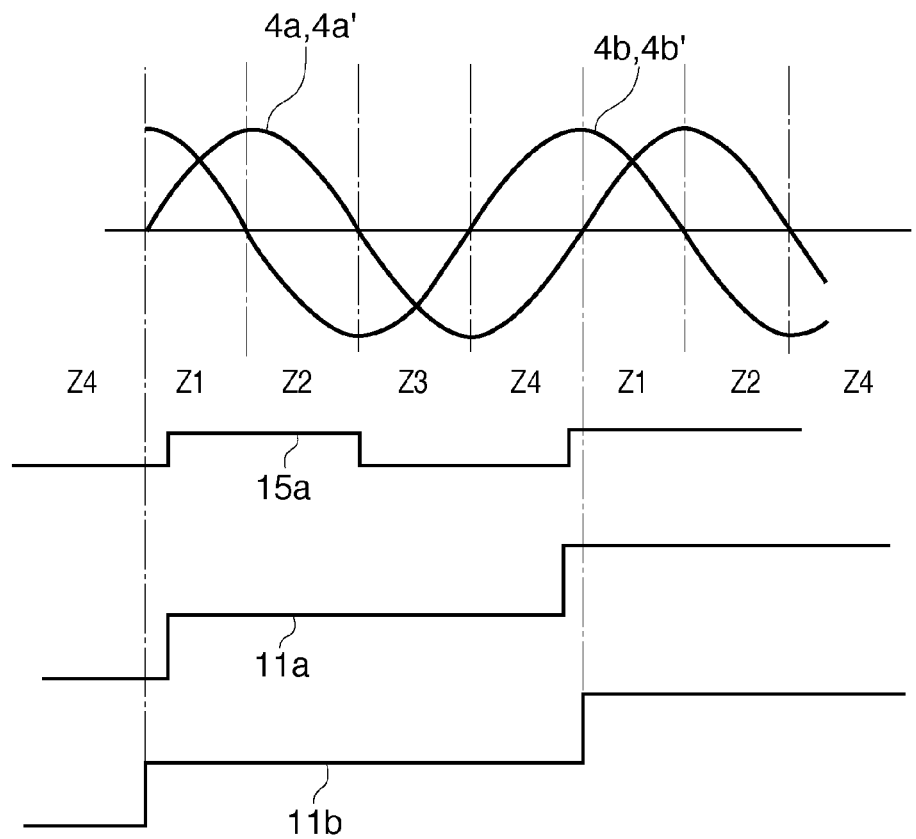
FIG. 5 is a timing chart showing a conventional discontinuity compensation method.

However, if the change timing of the binary signal 15a shifts from the appropriate timing as shown in, for example, FIG. 5, the change timing of the count value also shifts, as indicated by 11a. When the binary signal 15a is at low level in the region Z1, the count value 11a is compensated to 11b by increasing the value by one. Similarly, when the binary signal 15a is at high level in the region Z4, the count value 11a is compensated to 11b by decreasing the value by one.

Figure 6:
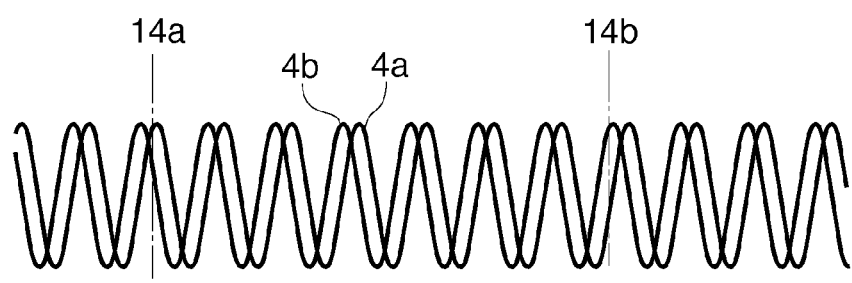
FIG. 6 is a view showing the relationship between a sampling period and periodic signals.

The above-described conventional method is effective on the assumption that the regions Z1, Z2, Z3, and Z4 are identifiable. However, in digital signal processing, a signal is processed at a predetermined sampling interval (sampling period). Analog/digital conversion of the periodic signals 4a and 4b is also done at a predetermined sampling interval. Hence, if the period of the periodic signals 4a and 4b shortens, as shown in FIG. 6, the change of the analog signal becomes faster with respect to the time resolution of sample and hold in analog/digital conversion because of the relationship to the sampling interval (sampling period). At, for example, sampling points 14a and 14b, it is difficult to accurately detect the regions Z1 to Z4.

The above-described method of compensating the count value (or synchronizing the change of the arctangent value with that of the count value) based on only the current values of the periodic signals 4a and 4b has a limitation.

In this embodiment, the processor 8 compensates the count value 11 based on the driving instruction 16 to drive the motor 2a. The motor 2a rotationally drives its rotation axis (rotor) and the mirror 1 by a force proportional to the driving signal 5 (or driving instruction 16). In other words, the acceleration (angular acceleration) of the rotation axis of the motor 2a and the mirror 1 is proportional to the driving signal 5 (or driving instruction 16).

The differential value of position information is velocity information. In digital signal processing, the difference in position information at the sampling time interval is convenient as velocity information. Similarly, the difference in velocity information at the sampling interval (sampling period) is convenient as acceleration information. Actually, to obtain velocity information based on position information, position information needs to be divided by the sampling period. To obtain acceleration information based on velocity information, velocity information needs to be divided by the sampling period. However, the sampling period is a constant and can be included in a constant M to be described later.

Let Position(k), Velocity(k), and Accel(k) be position information, velocity information, and acceleration information at a sampling point k, respectively.

The velocity information Velocity(k) and acceleration information Accel(k) at the sampling point k are given by $$\text{Velocity}(k)=\text{Position}(k)-\text{Position}(k-1) \tag{1}$$

$$\text{Accel}(k)=\text{Velocity}(k)-\text{Velocity}(k-1) \tag{2}$$

Let Curr(k) and TargetP(k) be the driving instruction value 16 and the target position (target angle) of the mirror 1 at the sampling point k, respectively. In a simple example, the processor 8 can decide Curr(k) by $$\text{Curr}(k)=\text{Gain}\times(\text{Target}P(k)-\text{Position}(k)) \tag{3}$$

where Gain is a constant representing gain.

The processor 8 may decide Curr(k) by, e.g., PID processing. In this embodiment, however, the processor 8 decides Curr(k) by equation (3) for the descriptive convenience.

The driving instruction value 16 at a sampling point (k−1) can be expressed as Curr(k−1). Curr(k−1) is given by $$\text{Curr}(k-1) = \text{Gain} \times (\text{Target}P(k-1) - \text{Position}(k-1)) \quad (4)$$

Curr(k) computed by equation (3) at the sampling point (k−1) is Curr(k−1) at the sampling point k. Hence, every time Curr(k) is computed by equation (3), the value obtained by the computation is held. This enables to use the value as Curr(k−1) at the next sampling point.

The driving instruction value Curr(k−1) and the acceleration information Accel(k) have a relationship given by $$\text{Accel}(k) = M \times \text{Curr}(k-1) \quad (5)$$

where M is a proportionality factor. When the mirror 1 is accelerated in accordance with the driving instruction value Curr(k−1) at the sampling point (k−1), the acceleration of the mirror 1 at the sampling point k is detected as the acceleration Accel(k).

The processor 8 compensates the count value based on a difference Diff between Accel(k) computed by equations (1) and (2) and the product of M and Curr(k−1) decided at the sampling point (k−1) by equation (3) (or Curr(k−1) decided by equation (4)). The difference Diff is given by $$\text{Diff} = \text{Accel}(k) - M \times \text{Curr}(k-1) \quad (6)$$

where M×Curr(k−1) is the estimated acceleration value, as is apparent from equation (5). Accel(k) according to equations (1) and (2) is computed based on the position information Position(k) decided by the count value 11 that can contain errors. If the value Diff is larger than a positive first threshold Th (Th>0) and smaller than a negative second threshold −Th (Th>0), it can be determined that the count value 11 contains errors. Note that Th is defined to enable to determine the presence/absence of an error corresponding to one count value. For example, a value that is 90% of an error amount corresponding to one count value can be defined as Th.

FIG. 7 is a flowchart illustrating the count value compensation operation of the processor 8. In step S1, the processor 8 calculates the velocity information Velocity(k) by equation (1) using the position information Position(k) at the current sampling point k and the position information Position(k−1) at the past sampling point (k−1).

In step S2, the processor 8 calculates the acceleration information Accel(k) by equation (2) using the velocity information Velocity(k) at the current sampling point k and the velocity information Velocity(k−1) at the past sampling point (k−1).

In step S3, the processor 8 computes, by equation (6), the difference Diff between the acceleration information Accel (k) computed in step S2 and the product of M and the driving instruction value Curr(k−1) decided at the past sampling point (k−1).

In step S4, the processor 8 determines whether the value Diff is larger than the positive first threshold Th (Th>0). If the value Diff is larger than the positive first threshold Th (Th>0), the process advances to step S5 to compensate the count value 11 (compensate the position information). On the other hand, if the value Diff is not larger than the positive first threshold Th (Th>0), the processor 8 advances the process to step S6. That the value Diff is larger than the positive first threshold Th (Th>0) means that the count value 11 is erroneously larger by one.

In step S6, the processor 8 determines whether the value Diff is smaller than the negative second threshold −Th (Th>0). If the value Diff is smaller than the negative second threshold −Th (Th>0), the process advances to step S7 to compensate the count value 11 (compensate the position information). On the other hand, if the value Diff is not smaller than the negative second threshold −Th (Th>0), the processor 8 ends the series of processes shown in FIG. 7. That the value Diff is smaller than the negative second threshold −Th means that the count value 11 is erroneously smaller by one.

In step S5, the processor 8 compensates the position information Position(k) by decreasing the count value 11 by one. When one period is divided into R (e.g., 1024), compensation is done by $$\text{Position}(k) = \text{Position}(k) - R \quad (7)$$

For example, if Velocity(k) and/or Accel(k) is necessary for computing Curr(k), Velocity(k) and/or Accel(k) is computed based on Position(k) compensated by equation (7).

In step S7, the processor 8 compensates the position information Position(k) by increasing the count value 11 by one. When one period is divided into R (e.g., 1024), compensation is done by $$\text{Position}(k) = \text{Position}(k) + R \quad (8)$$

For example, if Velocity(k) and/or Accel(k) is necessary for computing Curr(k), Velocity(k) and/or Accel(k) is computed based on Position(k) compensated by equation (8).

As another embodiment, the count value 11 may be compensated based on discontinuity detected by comparing an acceleration Accel(k−1) at an immediately preceding sampling point(k−1) with the acceleration Accel(k) at a current sampling point k. This method uses the fact that the acceleration or angular acceleration of a moving object having a mass or a moment of inertia never largely charges during a short time. Discontinuity is detected by setting a reference decided in accordance with the maximum value of the acceleration change in a normal operation. In processing of this embodiment, equation (6) executed in step S3 of the processing in FIG. 7 is replaced with $$\text{Diff} = \text{Accel}(k) - \text{Accel}(k-1) \quad (9)$$

In the above-described embodiments, the motor 2a is a rotary motor, and the encoder 2b is a rotary encoder. However, the present invention is also applicable to an arrangement in which the motor 2a is a linear motor, and the encoder 2b is a linear encoder.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-009360, filed Jan. 19, 2009, which is hereby incorporated by reference herein in its entirety.

What is claimed is:

1. A controller which generates a driving signal for controlling driving of an object based on two periodic signals that have respective phases different from each other and correspond to a position of the object, the controller comprising:
   a counter configured to count periods of one of the two periodic signals; and
   a processor configured to detect the position of the object based on a count value provided by the counter and a phase obtained by the two periodic signals, and to generate the driving signal based on the detected position,
   wherein the processor is configured to compensate for an error in the count value based on an acceleration of the object obtained at a current sampling point based on a plurality of detected positions, and a reference for the obtained acceleration.

2. The controller according to claim 1, wherein the processor is configured to decrease the count value by one if a value obtained by subtracting the reference from the obtained acceleration is larger than a positive first threshold, and to increase the count value by one if the value is smaller than a negative second threshold.

3. The controller according to claim 1, wherein the processor is configured to use, as the reference, an acceleration of the object estimated based on the driving signal.

4. The controller according to claim 1, wherein the processor is configured to use, as the reference, an acceleration of the object obtained at a past sampling point before the current sampling point based on a plurality of the detected position.

5. A machining apparatus comprising:
a driving mechanism configured to drive an object;
an encoder configured to generate two periodic signals that have respective phases different from each other and corresponds to a position of the object; and
a controller configured to generate a driving signal to control the driving mechanism based on the two periodic signals,
wherein said controller comprises:
a counter configured to count periods of one of the two periodic signals; and
a processor configured to detect the position of the object based on a count value provided by the counter and a phase obtained by the two periodic signals, and to generate the driving instruction based on the detected position,
wherein the processor is configured to compensate for an error in the count value based on an acceleration of the object obtained at a current sampling point based on a plurality of detected positions, and a reference for the obtained acceleration.

6. The apparatus according to claim 5, wherein the object includes a mirror, and the driving mechanism includes a rotary motor.

7. The apparatus according to claim 5, wherein the processor is configured to use, as the reference, an acceleration of the object estimated based on the driving signal.

8. The apparatus according to claim 5, wherein the processor is configured to use, as the reference, an acceleration of the object obtained at a past sampling point before the current sampling point based on a plurality of the detected position.

* * * * *